United States Patent [19]
Frutschi et al.

[11] Patent Number: 5,906,095
[45] Date of Patent: May 25, 1999

[54] METHOD OF OPERATING A POWER STATION PLANT WITH STEAM COOLING

[75] Inventors: Hansulrich Frutschi, Riniken; Alfred Häusermann, Rieden, both of Switzerland

[73] Assignee: Asea Brown Boveri AG, Baden, Switzerland

[21] Appl. No.: 08/805,552

[22] Filed: Feb. 27, 1997

[30] Foreign Application Priority Data

Mar. 14, 1996 [DE] Germany .......................... 196 09 912

[51] Int. Cl.[6] ................................. F02C 3/30; F02C 6/18
[52] U.S. Cl. ...................... 60/39.05; 60/39.182; 60/39.53
[58] Field of Search ............................. 60/39.05, 39.182, 60/39.53, 39.54, 39.75

[56] References Cited

U.S. PATENT DOCUMENTS

| | | | |
|---|---|---|---|
| 4,314,442 | 2/1982 | Rice | 60/39.182 |
| 4,424,668 | 1/1984 | Mukherjee | 60/39.182 |
| 5,340,284 | 8/1994 | Cunha | 60/39.54 |
| 5,428,950 | 7/1995 | Tomlinson et al. | 60/39.182 |
| 5,613,356 | 3/1997 | Frutschi | 60/39.182 |

FOREIGN PATENT DOCUMENTS

| | | |
|---|---|---|
| 2837714 | 3/1980 | Germany . |
| 4336143A1 | 5/1995 | Germany . |
| 4409567A1 | 9/1995 | Germany . |

*Primary Examiner*—Louis J. Casaregola
*Attorney, Agent, or Firm*—Burns, Doane, Swecker & Mathis, L.L.P.

[57] ABSTRACT

In a method of operating a power station plant, which essentially comprises a gas-turbine group, a waste-heat steam generator and a steam cycle, at least one portion of the steam (15, 29, 44) generated indirectly or directly in the waste-heat steam generator (14) is used for cooling thermally loaded structures of the gas-turbine group, this steam being at a varying preparation stage: the superheated steam (15) cools the structures (21, 25) on the high-pressure side, and the intermediate-pressure steam (29) and the flash steam (44) cool the structures (32, 36, 46) of the gas-turbine group which are on the low-pressure side. After cooling is effected, the respective cooling-steam quantity (22, 26; 33, 37) is directed into a working-air flow (3, 6; 8, 11) of the gas-turbine process.

10 Claims, 2 Drawing Sheets

METHOD OF OPERATING A POWER STATION PLANT WITH STEAM COOLING

BACKGROUND OF THE INVENTION

1. Field of the Invention

The present invention relates to a method of operating a power station plant according to the preamble of claim 1.

2. Discussion of Background

EP-A1-0 462 458 has disclosed a power station plant which essentially comprises a gas-turbine group, a waste-heat steam generator arranged downstream, and an injector system. The components of said gas-turbine group, as an autonomous unit, comprise a generator, a compressor, a combustion chamber and a turbine. The exhaust gases from the turbine are fed to the waste-heat steam generator, where they continue to be utilized in an energetic manner. With the released thermal energy from these exhaust gases, high-pressure steam is generated in a high-pressure part of the waste-heat steam generator, which high-pressure steam is fed to the said injector system and is admitted to the driving nozzle there. Compressed air from the compressor is directed into the receiving nozzle of this injector system: this air is further compressed by the action of the driving nozzle. If the waste-heat steam generator is designed as a dual-pressure boiler, the steam prepared in the low-pressure part is fed, for example, to the combustion chamber. The ultimate purpose of these measures is primarily to minimize the pollutant emissions, in particular the NOx emissions. Besides, the fact of the matter is that, although the specific output of the plant increases, the efficiency gain nonetheless remains relatively modest, so that such a plant does not constitute an alternative to a fully formed combined-cycle plant with regard to efficiency and also specific output.

SUMMARY OF THE INVENTION

Accordingly, one object of the invention, in a method of operating a power station plant of the type mentioned at the beginning, is to maximize the efficiency, the specific output and the cooling effect by directing steam quantities into the gas-turbine group and in addition to minimize the pollutant emissions, in particular as far as the NOx emissions are concerned, from the operation of such a power station plant.

The basic circuit of the gas-turbine group is designed for sequential combustion. However, it is not out of the question to apply the features according to the invention to a gas-turbine group of different construction. A gas-turbine group designed for sequential combustion, to a very special degree, is surprisingly suitable for injecting steam in its circuit, which steam is generated in a waste-heat steam generator arranged downstream. The outputs achievable here, depending on the cycle arrangement, are higher than the output of a conventional gas-turbine group operated without steam injection by a factor of two to three. Furthermore, the efficiency of such a gas-turbine group operated with steam injection reaches values which very closely approach those of a modern combined-cycle plant.

In addition, an important advantage of the invention has to be seen in the fact that the steam used is suitable in a special manner for cooling the thermally loaded structures of the gas-turbine group before the injection into the working-air (that is, working fluid or hot gas) flow of the gas-turbine group is effected.

A further important advantage of the invention may be seen in the fact that the specific costs of such a gas-turbine group with steam injection turn out to be substantially lower than those of a combined-cycle plant, thus resulting in very good prospects on the market.

A further advantage of the invention may be seen in the fact that the water consumption of such a plant is only about two-thirds of that of a modern steam power plant with wet cooling tower; the water consumption of this plant is approximately of the same order of magnitude as that of a combined-cycle plant of the same output. Although it is true that the water for this must undergo partial processing, its costs turn out to be so insignificant that they have virtually no effect on the power generation costs.

The low specific costs of construction to be expected, the high efficiency and the possibility of quick start-up and loading predestine this concept for use in plants which are designed for medium- and peak-load operation. However, the main field of application is probably base-load operation.

Furthermore, that conditioning of the flame temperature in the combustion chambers which leads to minimization of the NOx emissions is achieved by a specific steam injection.

Advantageous and expedient further developments of the achievement of the object according to the invention are defined in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
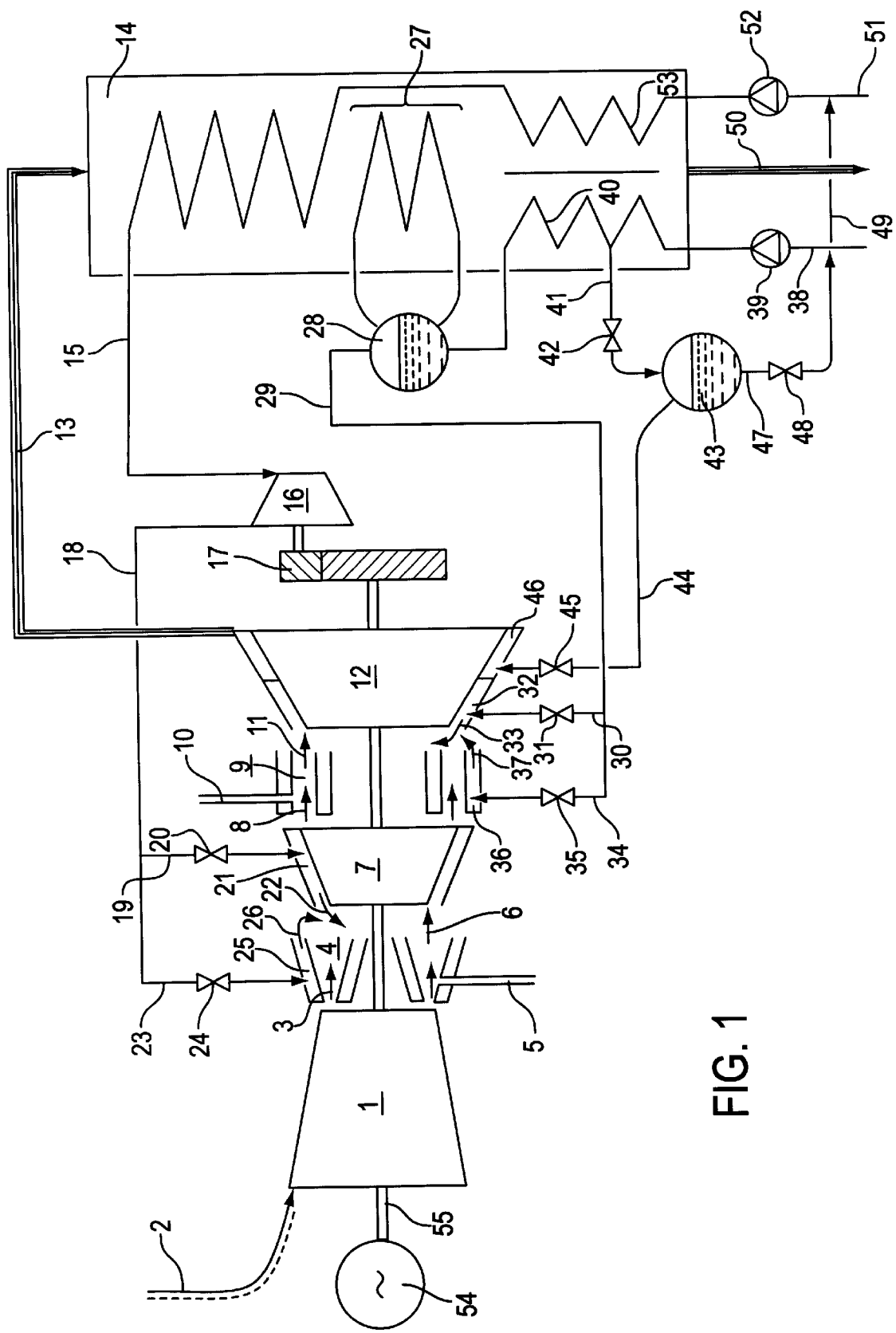
FIG. 1 shows a circuit of a gas-turbine group with sequential combustion, having a waste-heat steam generator and steam injection at a suitable point.

Referring now to the drawings, wherein like reference numerals designate identical or corresponding parts throughout the several views, all elements not essential for directly understanding the invention have been omitted, and the direction of flow of the media is indicated by arrows, FIG. 1 shows a gas-turbine group which interacts with a waste-heat steam generator 14, the steam prepared in this waste-heat steam generator 14 being injected at a suitable point, directly or indirectly, into the gas-turbine group. With regard to the fuels used for operating the combustion chambers, the following may be said: the requisite fuel may be provided, for example, by coal gasification interacting with the gas-turbine group. It is of course also possible to obtain the fuels used from a primary network. If a gaseous fuel for operating the gas-turbine group is supplied via a pipeline, the potential from the pressure and/or temperature difference between primary network and consumer network may be recuperated for the requirements of the gas-turbine group, or the plant in general, by suitable measures. The gas-turbine group, as an autonomous unit, consists of a compressor 1, a first combustion chamber 4 arranged downstream of the compressor 1, a first turbine 7 arranged downstream of this combustion chamber 4, a second combustion chamber 9 arranged downstream of this turbine 7, and a second turbine 12 arranged downstream of this combustion chamber 9. Said turbomachines 1, 7, 12 have a common rotor shaft 55 which is coupled by a coupling (not apparent) to a generator 54. This rotor shaft 55 is preferably mounted on two bearings (not shown) which are preferably arranged on the head side of the compressor 1 and downstream of the second turbine 12. Depending on the design, the compressor stage, for example in order to increase the specific power, may be subdivided Unto two sectional compressor (not shown) having an intercooler connected in between. After it is compressed, the intake air 2 preferably flows into a casing (not shown) which includes the compressor outlet and the first turbine 7. Also accommodated in this casing is the first combustion chamber 4, which is preferably designed as a continuous annular combustion chamber and into which the compressed air 3 flows. The compressed air for the operation of the first combustion chamber 4 may of course be provided from an air accumulator system (not shown). On the head side, the annular combustion chamber 4 has a number of burners (not shown in more detail) distributed over the periphery, which burners are responsible for the combustion. Diffusion burners may be used here per se. For reducing the pollutant emissions, in particular as far as the NOx emissions are concerned, and for increasing the efficiency, it is advantageous to provide an arrangement of premix burners according to EP-0 321 809 B1, the patent subject matter from this publication being an integral part of this description; in addition, this also applies with regard to the type of fuel feed described there and the composition of the combustion air, for example enriched with a recycled flue gas, which in the present FIG. 1 can be used via fuel feeds 5 and 10 respectively. With regard to the type of feed and the composition of the combustion air, this also applies to the second combustion chamber 9. As far as the arrangement of these premix burners in the peripheral direction of the annular combustion chamber 4 is concerned, such an arrangement may differ from the conventional configuration of identical burners if required; premix burners of different size may be used instead. This is preferably done in such a way that a small premix burner of the same configuration is disposed in each case between two large premix burners. The size of the large premix burners, which fulfill the function of main burners, in relation to the small premix burners, which are the pilot burners of this annular combustion chamber 4, is established from case to case with regard to the combustion air passing through them, that is, in the normal case the compressed air 3 from the compressor 1. The pilot burners work as independent premix burners over the entire load range of the annular combustion chamber 4, the air coefficient remaining virtually constant. The main burners are switched on and off according to certain provisions specific to the plant. Since the pilot burners can be run on an ideal mixture over the entire load range, the NOx emissions are very low even at part load. In such a configuration, the encircling flow lines in the front region of the annular combustion chamber 4 come very close to the vortex centers of the pilot burners, so that an ignition per se is only possible with the pilot burners. During run-up, the fuel quantity 5 which is fed via the pilot burners is increased until the pilot burners are modulated, i.e. until the full fuel quantity is available. The configuration is selected in such a way that this point corresponds to the respective load-disconnection conditions of the gas-turbine group. The further power increase is then effected via the main burners. At the peak load of the gas-turbine group, the main burners are therefore also fully modulated. Since the configuration of "small" hot vortex centers, which is initiated by the pilot burners, between the "large" cooler vortex centers originating from the main burners turns out to be extremely unstable, very good burn-out with low CO and UHC emissions in addition to the NOx emissions is achieved even in the case of main burners operated on a lean mixture in the part-load range, i.e. the hot vortices of the pilot burners penetrate immediately into the small vortices of the main burners. The annular combustion chamber 4 may of course consist of a number of individual tubular combustion spaces which if need be are arranged in an inclined annular shape, sometimes also helically, around the rotor axis. This annular combustion chamber 4, irrespective of its design, is and may be arranged geometrically in such a way that it has virtually no effect on the rotor length. The resulting advantages from such a disposition will be dealt with in more detail further below. The hot gases 6 from this annular combustion chamber 4 are admitted to the first turbine 7 arranged directly downstream, the thermally expanding action of which on the hot gases 6 is deliberately kept to a minimum, i.e. this turbine 7 will accordingly consist of no more than one to two rows of moving blades. In such a turbine 7 it will be necessary to provide pressure compensation at the end faces for the purpose of stabilizing the axial thrust. The hot exhaust gases 8 partially expanded in turbine 7 and directly flowing into the second combustion chamber 9 are at quite a high temperature for the reasons explained; for specific operational reasons the design is preferably to allow for a temperature which is certainly still around 1000° C. This second combustion chamber 9 essentially has the form of a continuous annular, axial or quasi-axial cylinder; it may of course also consist of a number of axially, quasi-axially or helically arranged and self-contained combustion spaces. As far as the configuration of the annular combustion chamber 9 consisting of a single combustion space is concerned, a plurality of fuel lances 10 are disposed in the peripheral direction of this annular cylinder, in which case they may of course be connected to one another via a ring main (not shown). This combustion chamber 9 has no burners per se; the combustion of the fuel 10 injected into the hot exhaust gases 8 coming from the turbine 7 takes place here by self-ignition, if indeed the temperature level permits such a mode of operation. Starting from the assumption that the combustion chamber 9 is operated with a gaseous fuel, that is, for example, natural gas, the temperature of the hot exhaust gases 8 from the turbine 7 must be around 1000° C. for self-ignition, and this of course must also be the case during part-load operation, a factor which plays a causal role in the design of this turbine 7. In order to ensure the operational reliability and a high efficiency in the case of a combustion chamber designed for self-ignition, it is of the utmost importance that the flame front remains locally stable. For this purpose, a number of vortex generators (not shown in the figure), disposed in the peripheral direction, are provided in this combustion chamber 9, preferably on the inner and outer wall, which vortex generators are arranged in the direction of flow preferably upstream of the fuel lances 10. The task of these vortex generators is to produce vortices into which the fuel is then fed and which then induce a stabilizing backflow zone further downstream, analogous to that from the premix burners in the annular combustion chamber 4. Since this combustion chamber 9, on account of the axial arrangement and the overall length, is a high-velocity combustion chamber, the average velocity of which is greater than about 60 m/s, the vortex-producing elements, that is, the vortex generators, must be designed to conform to the flow. On the inflow side, these elements are to preferably consist of a tetrahedral shape having inclined surfaces with respect to the inflow. The vortex-producing elements, as already mentioned, may be placed on either the outer surface or the inner surface of the combustion chamber 9, or may act at either location. The inclined surfaces between the outer and the inner vortex-producing elements are preferably arranged in mirror image in such a way that the cross-section of flow in the combustion chamber 9 undergoes a backflow-producing expansion downstream of this location in the region of the injection of the fuel 10. The vortex-producing elements may of course also be displaced axially relative to one another. The outflow-side surface of the vortex-producing elements is directed essentially perpendicularly toward the inner wall so that the intended backflow zone can appear starting from this location. With regard to the specific configuration of the vortex generators, reference is made to publication EP-0 619 133 A1, which is an integral part of this description. However, the self-ignition in the combustion chamber 9 must also continue to be assured for various fuels in the transient load ranges as well as in the part-load range of the gas-turbine group, i.e. auxiliary measures must be provided which ensure the self-ignition in the combustion chamber 9 even if the temperature of the hot exhaust gases 8 in the region of the injection of the fuel 10 should possibly vary. In order to ensure this, a small quantity of another fuel having a lower ignition temperature may be added to this fuel. Fuel oil, for example, is very suitable here as "auxiliary fuel". The liquid auxiliary fuel, appropriately injected, performs the task of acting so to speak as a fuse and initiates self-ignition in the combustion chamber 9 even if the hot exhaust gases 8 from the first turbine 7 should be at a temperature below the desired optimum level. This measure of providing fuel oil for ensuring self-ignition certainly always proves to be especially appropriate when the gas-turbine group is operated at reduced load. Furthermore, this measure is a decisive factor in enabling the combustion chamber 9 to have a minimum axial length. The short overall length of the combustion chamber 9, the action of the vortex generators considered for forming the mixture and stabilizing the flame and the continual guarantee of self-ignition are responsible for causing the combustion to be effected very quickly, and the dwell time of the fuel in the region of the hot flame front remains minimal. An effect resulting herefrom which is directly measurable from the combustion relates to the NOx emissions, which are minimized in such a way that they are now no longer relevant. Furthermore, this initial situation enables the location of the combustion to be clearly defined, which is reflected in optimized cooling of the structures of this combustion chamber 9. The hot gases 11 prepared in the combustion chamber 9 are then admitted to a second turbine 12 arranged downstream. The thermodynamic characteristics of the gas-turbine group may be designed in such a way that the exhaust gases 13 from the second turbine 12 still have so much thermal potential to thus operate a waste-heat steam generator 14 arranged downstream. As already pointed out in the description of the annular combustion chamber 4, this annular combustion chamber 4 is arranged geometrically in such a way that it has virtually no effect on the rotor length. Furthermore, it could be established that the second combustion chamber 9 occupies a minimum length between the outflow plane of the first turbine 7 and the inflow plane of the second turbine 12. Furthermore, since the expansion of the hot gases 6 in the first turbine 7, for reasons explained, takes place over few rows of moving blades, a compact gas-turbine group can be provided. It is of advantage for increasing the efficiency of the gas-turbine group if a small diffuser (not apparent in the figure) is provided in front of the second combustion chamber 9. The total pressure loss in the entire system could therefore be reduced. It can be shown from the conventional diffuser design diagrams that large recovery rates of the dynamic pressure can be achieved even at a minimum length of the diffuser. As explained above, the compressor stages may be equipped with intercooling. In order not to alter the basic geometric conception of the gas-turbine group, as shown in the figure, when establishing the basis for such intercooling, it is proposed to provide an intercooler (not shown in the figure) which is placed inside the stator casing and right in the direction of flow of the compressor stages. The cooling in this intercooler takes place indirectly or directly. In the case of direct intercooling, this may be effected, for example, by a unit whose operation is designed for the evaporation of the injected water. Thus a configuration is obtained such that conventional connecting lines to an intercooler placed outside the stator casing and from this intercooler back through the stator casing to the next compressor stage are completely dispensed with. As already explained, the exhaust gases 13 from the second turbine 12 flow through the waste-heat steam generator 14 and are then diverted as flue gases 50. The waste-heat steam generator 14 provides two types of steam. A portion thereof relates to a quantity of steam which first of all passes as feed water 51 through a first economizer stage 53 via a feed pump 52 in order to then be admitted as superheated steam 15 to a backpressure turbine 16. The work produced by the backpressure turbine 16 can either be transmitted as shown to the rotor shaft 55 via gearing 17, in which case this work flows toward the common generator 54, or a generator coupled to the backpressure turbine 16 rotating in a supersynchronous manner for aerodynamic reasons is directly connected to the network via a frequency converter. The direct coupling via gearing enables direct start-up with steam, provided such steam is available. However, an electrical connection of the two generators also permits start-up with steam. A portion 19 of the backpressure steam 18 flowing off from said steam turbine 16 flows via a control element 20 through the hot structures 21 to be cooled, for example through the stator, of the first turbine 7; another portion 23 likewise flows via a control element 24 and serves to cool the hot structures 25 of the first combustion chamber 4. These cooling-steam quantities 22, 26 are greatly superheated in heat exchange with the structures to be cooled and finally, together with the compressed air 3 coming from the compressor 1, are brought by open combustion of the fuel 5 to the required mixing temperature at the inlet to the first turbine 7. The introduction of said cooling-steam quantities 22, 26 into the working-air flow of the gas-turbine process may also be effected, at least partly, downstream of the fuel injection. A portion of the steam 19 may of course also serve to cool rotating hot structures. An evaporator device 27 likewise arranged in the waste-heat steam generator 14 serves to generate intermediate-pressure steam 29 via a drum 28, which intermediate-pressure steam 29 serves to cool the hot structures of the second combustion chamber 9 and the second turbine 12. A portion 30 of this intermediate-pressure steam flows via a control element 31 into the hot structures 32 to be cooled of the front part of the second turbine 12; the other portion 34 likewise flows via a control element 35 into the hot structures 36 to be cooled of the second combustion chamber 9. These cooling-steam quantities 33, 37, together with the partly expanded hot gases 8 from the first turbine 7, are brought by fuel 10 in open combustion to the required mixing temperature at the inlet to the second turbine 12. Of course, the introduction of said cooling-steam quantities 33, 37 into the working-air flow of the gas-turbine process may also be effected here, at least partly, downstream of the fuel injection. Here, too, a portion of the steam 29 may serve to cool rotating hot structures. Finally, by means of flash steam 44 from an evaporation flask 43 which interacts with a second economizer stage 40 in the waste-heat steam generator, cooling of hot structures of the rear part 46 of the second turbine 12 may be effected, where a lower steam pressure is also sufficient. This flash steam 44 also flows through a control element 45 before it is used. Said second economizer stage 40 in the waste-heat steam generator 14 is fed with feed water 38 via a feed pump 39. In this case, a feed-water quantity increased above 100% is fed here into this economizer stage 40, 100% being considered to be that nominal water quantity which is in relation to the energy offered by the exhaust gases 13. The portion 41 above 100% of the feed-water quantity is diverted from the economizer stage 40 at a suitable point and via a control element 42 into the evaporation flask 43 already mentioned, from which the flash steam 44 already described then flows out. The nominal water quantity then flows into the drum 28 already described. Drain water 47 flows via a control element 48 out of the evaporation flask 43 and feeds the feed water 38 to the second economizer stage 40 and respectively the feed water 51 via a feed line 49 to the first economizer stage 53. In both cases, this drain water appropriately preheats said feed-water quantities by mixing so that low-temperature corrosion need not be feared. The ingenious graduation for generating the different steam portions 15, 29, 44 inside the waste-heat steam generator 14 enables the exergy of the exhaust gases 13 to be utilized to the greatest possible extent down to a stack temperature in the region of 100° C.

Figure 2:
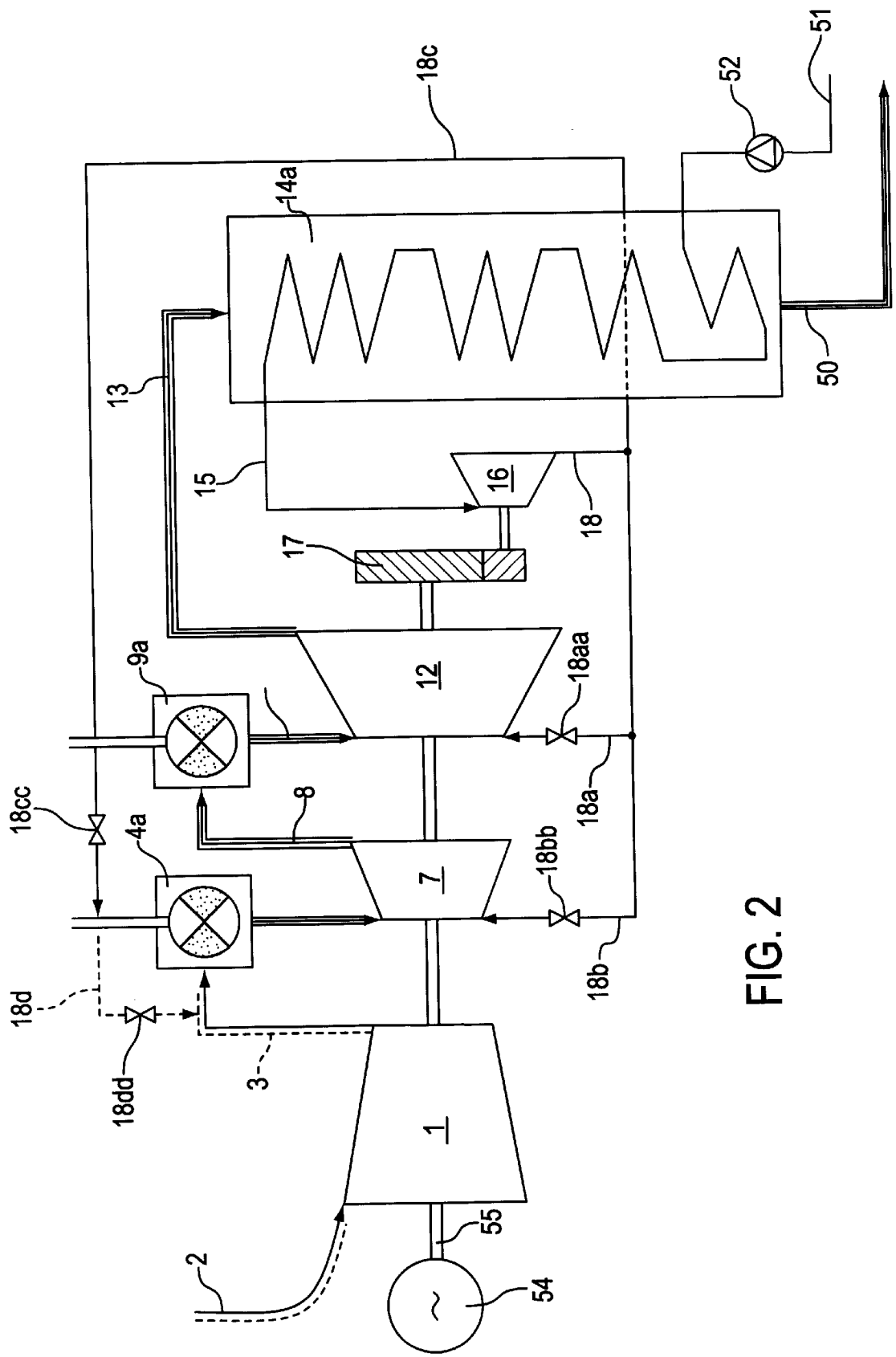
FIG. 2 shows a further circuit of a gas-turbine group according to FIG. 1, having modified steam injection.

FIG. 2 shows an essentially similar power station plant as shown and described with reference to FIG. 1. Here, too, the gas-turbine group operates according to sequential combustion, in which case the combustion chambers 4a, 9a need not necessarily be designed in accordance with the technology according to FIG. 1. Here, too, the exhaust gases 13 from the last turbine 12 are directed into a waste-heat steam generator 14a, which, however, is of a simpler construction per se compared with that from FIG. 1. The feeding of feed water 51 via feed pump 52 into the waste-heat steam generator 14a takes place continuously in such a way that superheated steam 15 is formed, which in an analogous manner to the circuit according to FIG. 1 is admitted first of all to a backpressure turbine 16. The work produced by this turbine is preferably transmitted via gearing 17 to the rotor shaft 55, in which case this work flows toward a common generator 54. The backpressure steam 18 flowing off from said steam turbine 16 is distributed over a plurality of conduits which are fitted with control elements 18aa, 18bb, 18cc, 18dd and preferably cool the thermally loaded structures of the gas-turbine group—thus the conduits 18a and 18b for the second turbine 12 and the first turbine 7 respectively, or if need be as admixing steam quantities 18c and 18d for the first combustion chamber 4a and the compressed air 3 respectively. The steam quantities 18a, 18b superheated by cooling effect can then be directed at a suitable point into the respective working-air flow. Said control elements enable the introduction of steam to be effected in a specific manner at various points of the gas-turbine group. In this waste-heat steam generator 14a, too, the exergy of the exhaust gases 13 is utilized to the greatest possible extent down to a lower temperature of the flue gases 50. For both power station plants described, the generation of supercritical steam produces the best results.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a power station plant, essentially comprising a gas-turbine group and a waste-heat steam generator arranged downstream of the gas-turbine group, the gas-turbine group comprising at least one compressor unit, at least one combustion chamber, at least one turbine and at least one generator, and the exhaust gases from the at least one turbine in the gas turbine group flow through the waste-heat steam generator, in which the generation of at least two steam portions takes place, said method comprising the steps of:

generating at least two portions of steam at different pressures in the waste-heat steam generator;

directing each steam portion to a thermally loaded structure of the gas turbine group for cooling purposes; and directing each steam portion after cooling is effected, into a working fluid flow of the gas-turbine group wherein a highest pressure steam portion is directed into the working fluid flow closest to a first combustor of the gas-turbine group, and a lowest pressure steam portion is directed into the working fluid flow closest to an exhaust section of the gas-turbine group.

2. The method as claimed in claim 1, wherein the gas-turbine group is operated with at least two combustors arranged sequentially in a direction of working fluid flow, with intermediate expansion of the working fluid, to define a high pressure section between the at least two combustors and a low pressure section downstream of a last one of the at least two combustors.

3. The method as claimed in claim 1, wherein at least one of the steam portions is expanded in a turbomachine prior to being directed to the thermally loaded structure.

4. The method as claimed in claim 1, wherein thermally loaded structures of the gas-turbine group which are on a high-pressure section are cooled by the steam prepared in the waste-heat steam generator.

5. The method as claimed in claim 4, wherein cooling-steam quantities after cooling is effected, are directed into a working fluid flow of the gas-turbine group on the high-pressure section.

6. The method as claimed in claim 1, wherein an evaporator device operates in the waste-heat steam generator, from which evaporator device an intermediate-pressure steam is provided.

7. The method as claimed in claim 6, wherein the thermally loaded structures of the gas turbine group which are on the low-pressure section are cooled by the intermediate-pressure steam.

8. The method as claimed in claim 1, wherein a cooling-steam quantity, after cooling is effected, is directed into a working fluid flow of the gas-turbine group on the low-pressure section.

9. The method as claimed in claim 1, wherein at least one economizer stage operates in the waste-heat steam generator, through which economizer stage a feed-water quantity greater than 100% of a nominal water quantity relative to energy of exhaust gases flows at first, and wherein a proportion above 100% is drawn off and directed into an evaporation flask for forming further steam.

10. The method as claimed in claim 9, wherein the steam is used for cooling the thermally loaded structures of the gas-turbine group which are on the low-pressure section.

\* \* \* \* \*